J. STANLEY.
Bridle Bit.
No. 201,566. Patented March 19, 1878.
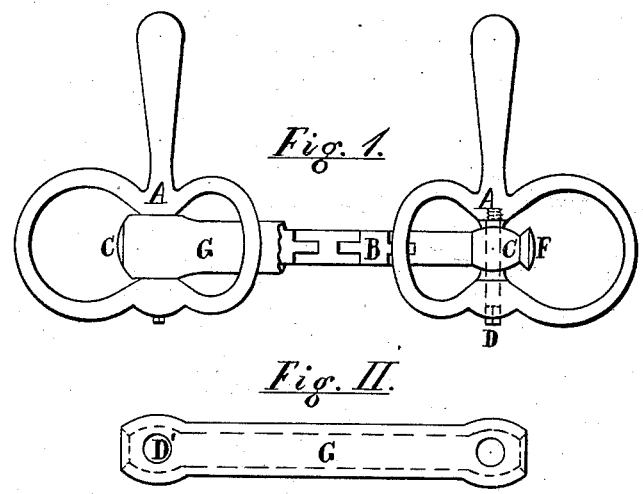
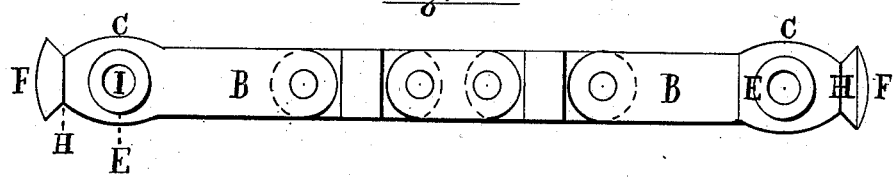
Attest:
P. J. Inslee
A. D. Wagner
Inventor.
James Stanley
By O. Drake, Atty

UNITED STATES PATENT OFFICE.

JAMES STANLEY, OF NEWARK, NEW JERSEY.

IMPROVEMENT IN BRIDLE-BITS.

Specification forming part of Letters Patent No. 201,566, dated March 19, 1878; application filed December 10, 1877.

*To all whom it may concern:*

Be it known that I, JAMES STANLEY, of the city of Newark, in the county of Essex and State of New Jersey, have invented certain new and useful Improvements in Bridle-Bits; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to an improvement in bridle-bits for horses, and is fully shown in the annexed drawing, where—

Figure 1 is a full view of the bit, the cheek-pieces A naturally falling over and partly covering the mouth-piece B. Fig. 2 is a top view or plan of the rubber covering for the mouth-piece, and Fig. 3 the metallic part of the mouth-piece.

My improvement consists in forming the flexible part of the mouth-piece of hinge-jointed links, fitting snugly together, and rigid between the upper and lower jaws of the horse, while bending freely backward and forward.

In section, the mouth-piece is round, and covered with a piece of common rubber tubing, or a cast rubber tube formed especially for the purpose.

Fig. 2 shows a piece of common tubing of the shape it assumes on the mouth-piece, the holes D' being provided to fit around the rivet D, or, preferably, around a boss, E E, formed on the head C, to keep the rivet from wearing the rubber.

At I in Fig. 3 are shown the holes provided for the rivets D in the heads C C, as well as the bosses E E.

At F, I also form a boss, against which the ends of the rubber tube G make a close joint when drawn over B, thus including the heads C C as well as B under the protection of the cover G, the groove at H behind boss E being absolutely necessary to cover the ends of the tube when the head C is made solid, although it can be dispensed with if a button is screwed or riveted into the end of the head to cover the ends of G. The button, as well as the cheek-pieces and all uncovered portions of the mouth-piece, may be polished or plated in the usual way, whether made of wrought or malleable iron or other metals.

I am aware that rubber is used to cover mouth-pieces; but I claim as new the construction of the mouth-piece upon which I place the rubber tube, chain mouth-pieces being liable to twist and break, while mine cannot twist, and can be made much stronger than any chain in use.

Having thus described my invention, what I claim, and desire to secure by Letters Patent, is—

1. The within-described bit, consisting of a series of sections having tongues and recesses, and pivoted together by parallel pins, as set forth.

2. The combination, with the bit consisting of tongues and recessed sections, pivoted by parallel pins and having bosses E, of a loose sleeve of rubber, as specified.

In testimony that I claim the foregoing as my own I hereto affix my signature in presence of two witnesses.

JAMES STANLEY.

Witnesses:
OLIVER DRAKE,
P. J. INSLEE.